June 29, 1937.  E. B. BRANNAN  2,085,628
COMPENSATING VOLUME CONTROL SAFETY DEVICE
Filed Oct. 19, 1936   2 Sheets-Sheet 1
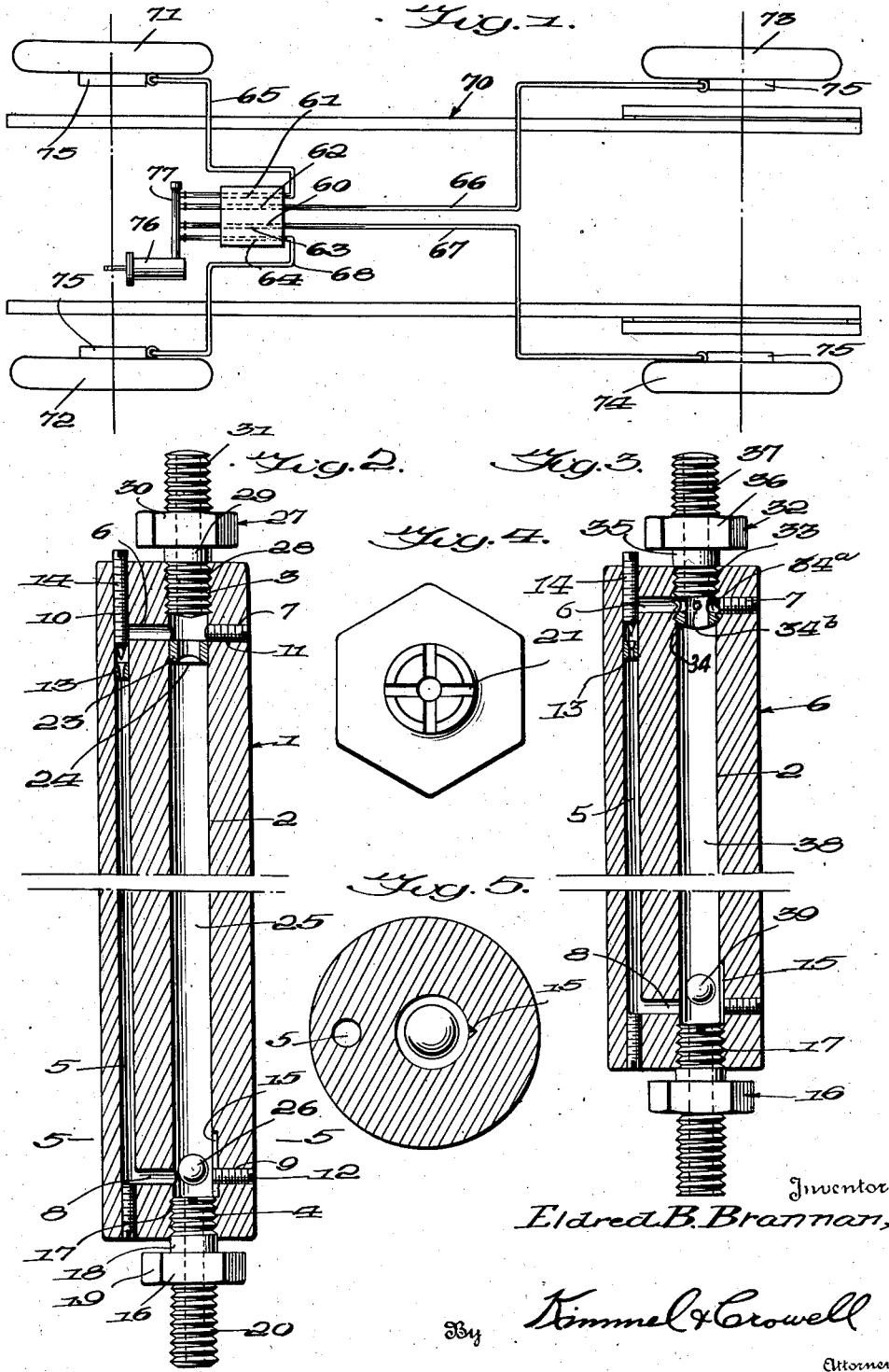

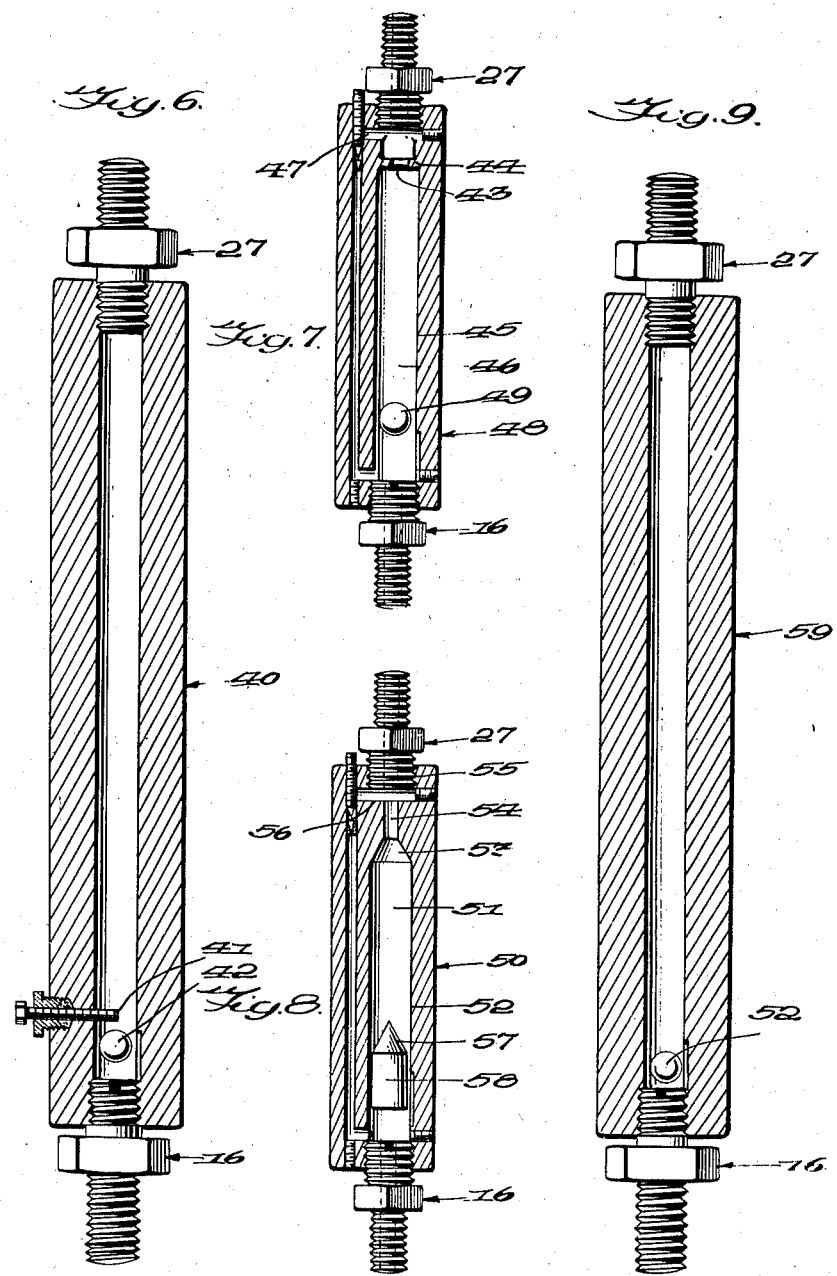

Patented June 29, 1937

2,085,628

UNITED STATES PATENT OFFICE 2,085,628

COMPENSATING VOLUME CONTROL SAFETY DEVICE

Eldred B. Brannan, Ogden, Utah, assignor of twenty-five per cent to David H. Dunham and twenty-five per cent to George L. Niles, both of Alcova, Wyo.

Application October 19, 1936, Serial No. 106,460

6 Claims. (Cl. 303—84)

This invention relates to a compensating volume control safety device for use in conjunction with air and hydraulic pressures travelling through one or more conduits supplied from a single source of pressure, and aims to automatically close a conduit in case of a leak or break in the latter to prevent the waste of pressure.

The safety device, in accordance with this invention is designed primarily for use in connection with hydraulic brakes of the four-wheel type for automotive vehicles, but it is to be understood that a safety device, in accordance with this invention, may be employed in any connection for which it may be found applicable, and the invention has for its object to provide, in a manner as hereinafter set forth, a safety device when forming a part of a hydraulic braking system for the front and rear wheels of an automotive vehicle acting to automatically close the flow of pressure only through that pressure conducting line leading to a brake unit when a break or leak develops in such line, whereby a waste of pressure from the system is prevented and the danger of the entire braking system being rendered inoperative is obviated.

Further objects of the invention are to provide, in a manner as hereinafter set forth, a compensating volume control safety device which is simple in its construction and arrangement, strong, durable, compact, readily installed with respect to a pressure conduit, thoroughly efficient in its use, conveniently repaired when occasion requires, formed of detachably connected together parts permitting of an impaired part being detached and a non-impaired part substituted therefor without discarding the non-impaired parts, and comparatively inexpensive to manufacture.

With the foregoing and other objects in view, the invention consists of the novel construction, combination and arrangement of parts as will be more specifically described and are as illustrated in the accompanying drawings wherein are shown embodiments of the invention, but it is to be understood that changes, variations and modifications may be resorted to which fall within the scope of the invention as claimed.

In the drawings:—

Figure 1 is a top plan view of a hydraulic braking system in connection with the front and rear wheels of an automotive vehicle and further illustrating the adaptation therewith of a set of volume control safety devices in accordance with this invention, Figure 2 is a view in longitudinal section of a volume control safety device, in accordance with this invention, Figure 3 is a view similar to Figure 2 of a modified form of safety device, Figure 4 is an elevation looking towards the inner end of the inlet connection employed in connection with the forms shown in Figures 2 and 3, Figure 5 is a section on line 5—5, Figures 2 and 3, and Figures 6, 7, 8 and 9 are longitudinal sectional views of still other modified forms.

The form of the device shown in Figures 1 to 9 includes a valve chamber of annular cross section and when but one of such devices is employed, such chamber is formed in a tubular member of the desired contour in side elevation, and this statement applies to a section of a pressure conducting line leading from the valve chamber to a point of application, as well as a valve controlled by-pass leading from the valve chamber to the said section of the conducting line, but when a plurality of such devices are employed, the valve chambers, a portion of each by-pass and a portion of each line are formed in one block.

With reference to Figures 2 and 3, each form includes a metallic casting 1 of any suitable cross section, preferably cylindrical. The casting 1 is bored axially from end to end thereof. The wall of the bore is indicated at 2 and each end terminal portion thereof is threaded as indicated at 3 and 4. The casting 1 has a bore 5 lengthwise thereof and which is arranged between the said axial bore and the outer periphery thereof. The bore 5 is of smaller diameter than said axial bore and extends from the rear end to a point inwardly adjacent the forward end of casting 1. The latter is also formed with diametrically disposed bores 6, 7, 8 and 9 of less diameter than the said axial bore. The bores 6, 7 are arranged in spaced inner endwise opposed relation and open at their inner ends in the said axial bore. The bores 8, 9 are arranged in spaced inner endwise opposed spaced relation and open into the said axial bore. The bore 6 opens into the bore 5. The bore 8 opens into the bore 5. The wall of the rear end terminal portion of the bore 5 is threaded as at 10. The bores 6, 7 are arranged inwardly adjacent the threaded portion 3 of the axial bore. The bores 8, 9 are arranged inwardly adjacent the threaded portion 4 of a wall of the axial bore. The bores 5, 6 and 8 coact to provide a by-pass. The walls of the bores 7, 9 are threaded. The bore 7 is closed by a plug 11. The bore 9 is closed by a plug 12. The plugs 11 and 12 are peripherally threaded. Arranged within the bore 5 inwardly adjacent with respect to the bore 6 is a tubular valve seat forming member 13. Threadedly engaging with the portion 10 of the bore 5 is an adjustable needle valve 14 for coacting with the said seat on the member 13 to close the by-pass to the bore 6. The wall 2 of the axial bore is formed with a V-shaped groove 15 which extends from the inner end of the threaded part 4 of the wall of the axial bore to beyond the bore 9. The bore 8 is arranged opposite and disposed intermediate the ends of the groove 15.

Threadedly engaging with the portion 4 of the wall 2 is a pressure intake member 16 of tubular form consisting of a peripherally threaded inner end part 17, an intermediate part 18 having a smooth periphery corresponding in outer diameter to that of the part 17, an intermediate part 19 of polygonal contour extending from the part 18 and an outer peripherally part 20 of greater length than and corresponding in outer diameter to that part 17. The inner end of the part 17 has its edges notched at equi-distant points, as at 21. The inner end of the part 17 of member 16 is arranged outwardly adjacent the bores 8, 9 and provides a valve seat for a globular valve 26.

With reference to Figure 2, a tubular member 23 is anchored to the wall 2 of the axial bore immediately inwardly adjacent the bores 6, 7. The member 23 is dished as at 24 to provide a valve seat. That part of the axial bore, with reference to Figure 2, between the inner end of the part 17 and the valve seat formed by the member 23 provides a valve chamber 25 for the globular valve 26.

The form shown in Figure 2 is provided with a pressure outlet member or element 27 of tubular form and consisting of an inner peripherally threaded part 28 which engages with the threaded portion 3 of the wall 2 of the axial bore and has its inner end arranged outwardly adjacent the bores 6, 7. The member 27 includes an intermediate portion 29 of smooth periphery and corresponding in outer diameter to the outer diameter of the part 28, a polygonal-shaped intermediate part 30 which extends laterally from the part 29 and an outer peripherally threaded part 31 corresponding in outer diameter to the diameter of the part 28. Part 31 merges into the part 30. The part 30 merges into the part 29 and the latter merges into the part 28.

The modified form shown in Figure 3 includes a pressure intake member of the same form as the member 16 and is so designated and a pressure outlet member or element 32 of tubular form and of a different construction than the element 27. The pressure outlet member or element 32 consists of an inner peripherally threaded part 33 which engages with the threaded portion 7 of the axial bore and has its inner end 34 providing a valve seat, an intermediate part 35 having a smooth periphery, an intermediate polygonal part 36 which extends from the part 35 and an outer peripherally threaded part 37. The outer diameter of the parts 33, 35 and 37 are substantially the same. Part 37 merges into the part 36; the part 36 merges into the part 35 and the latter merges into the part 33. The inner end of the part 33 is positioned forwardly of the bores 6, 7. The part 33 has a peripheral groove 34ᵃ which registers with bore 6. The part 33 has a port 34ᵇ which opens into groove 34ᵃ. That part of the axial bore, with reference to Figure 3, between the inner end of the members 16 and the inner end 34 of part 33 provides a valve chamber 38 for a ball valve 39. The groove 34ᵃ and the port 34ᵇ, in connection with the by-pass provide for the unseating of the valve 39 relative to the inner end 34 of element 32 when occasion requires.

The valve 26 of the form shown in Figure 2 is of less diameter than the valve chamber 25 and when engaged with the seat 24 closes the chamber 25 to the element 27.

The valve 39 of the form shown in Figure 3 is of less diameter than the valve chamber 38 and when engaged with the inner end 34 of element 32 closes the chamber 38 to the element 32.

The valves 14 of the form shown in Figures 2 and 3 act as means for closing the by-pass to the members 27 and 32. The valves 14 of the forms shown in Figures 2, 3 are for opening and closing the by-pass.

The grooves 15 in the forms shown in Figures 2 and 3 provide compensating means whereby the brakes will always release quickly due to the fact that they prevent the valves 26, 39 from completely shutting off the pressure. The grooves 15 coact with the notches 21 to insure the release and such release is quickly provided.

With respect to the forms shown in Figures 2 and 3, the pressure enters through the intake member 16. The member 27 or the member 32 is coupled to a pressure conducting line leading to the braking means. If this line should become broken, valve 26 will immediately engage valve seat 24 and valve 39 will immediately engage inner end 34 of element 32 and close off the leak. In hydraulic brake systems used today, 5-lb. pressure is maintained on the system at all times and which will keep the valve on its seat.

With reference to the form shown in Figure 3, the member 32 is magnetic and helps to hold the valve 39 on its seat. The part 32 as well as the valve 39 is constructed of steel.

With reference to the form shown in Figure 6, generally indicated at 40, it is of the same construction as that shown in Figure 1 with this exception that it includes an adjustable keeper 41 and that the valve controlled by-pass and bores 7, 9 are omitted. Otherwise, the form 40 corresponds to that shown in Figure 1. The adjustable keeper is employed to hold the valve 42 on down position while bleeding to enable the bleeding to be speeded up and after bleeding the keeper 41 is withdrawn from the valve chamber. The keeper 41 is a packing valve or valve with a packing nut on the valve to hold high pressures when the keeper is withdrawn.

With reference to the form shown in Figure 7, it is the same as that shown in Figure 1 with this exception that a cup-shaped valve seat 43 is formed on an annular flange 44 integral with the wall 45 of the axial bore 46. The seat 43 is positioned in proximity to the diametrically disposed bore 47. The body part of the form shown in Figure 7 is indicated at 48 and the globular valve operating in bore 46 at 49.

With reference to the form shown in Figure 8, the body part thereof is designated at 50 and is formed with an axially disposed bore 51 having its wall formed of a stretch 52, a stretch 53, a stretch 54 and a stretch 55. The stretch 52 is of greater length than the other stretches. The stretches 52, 55 are of like diameter. The stretch 54 is of smaller diameter than the other of said stretches. The stretch 53 is tapered.

The inner end of stretch 52 merges into the largest end of stretch 53. One end of stretch 54 merges into the smallest end of stretch 53 and its other end opens into stretch 55. The junction of stretches 54, 55 provides an annular shoulder 56. The stretch 53 forms a tapered valve seat for the pointed end 57 of the valve 58 operating in bore 51. Otherwise, the form shown in Figure 8 will be the same as that shown in Figure 1.

The form shown in Figure 9 is generally indicated at 59 and it is of the same construction as the form shown in Figure 6 with this exception that the keeper 41 is omitted.

With reference to Figure 1, there is illustrated a block 60 in which is arranged four compensating control safety devices in accordance with this invention and indicated at 61, 62, 63 and 64 and from the rear ends of which extend pressure conducting lines 65, 66, 67, and 68 respectively for the pressure operated brake mechanism 69 carried by the front and rear wheels of the vehicle 70. The front wheels are designated 71, 72 and the rear wheels 73, 74. The lines 65, 66 lead to the brake mechanisms 75 of the wheels 71, 72 respectively. The lines 67, 68 lead to the brake mechanisms of the wheels 73, 74 respectively. A master cylinder constituting a pressure reservoir is indicated at 76. Leading from the cylinder 76 is a horizontally disposed pressure supply pipe 77 which is common to and opens into the pressure intake elements of the devices 61, 62, 63 and 64.

When the pressure is reduced in a conducting line, due to a leak or break, the valve within the valve chamber of the safety device which is associated with said line seats to shut off the supply of pressure to the line. The function of the valve-controlled by-passes is the same and well known.

What I claim is:

1. In a compensating volume control safety device for the purpose set forth, a structure formed with a bore constituting a valve chamber, a valve controlled tubular pressure outlet means extending into one end of said bore, a valve operating in said chamber, and a tubular pressure intake member extending into the other end of said chamber and having its inner end notched, the inner end of said member constituting a valve seat for said valve.

2. In a compensating volume control safety device for the purpose set forth, a structure formed with a bore having the major portion of its length constituting a valve chamber, a tubular pressure outlet element extending into one end of said bore and having its inner end constituting a valve seat, a valve operating in said chamber, a tubular pressure intake element extending into the other end of said bore and having its inner end constituting a valve seat, the inner end edge of said intake element being notched, said valve being formed of a material capable of being attracted, and the said outlet member being magnetized.

3. In a compensating volume control safety device for the purpose set forth, a structure formed with a bore having the major portion of its length constituting a valve chamber, a tubular pressure outlet element extending into one end of said bore and having its inner end constituting a valve seat, a valve operating in said chamber, a tubular pressure intake element extending into the other end of said bore and having its inner end constituting a valve seat, the inner end edge of said intake element being notched, the wall of said chamber being formed with a short groove lengthwise thereof located in proximity to that end of the bore into which the intake element extends, said valve being formed of a material capable of being attracted, and the said outlet member being magnetized.

4. In a compensating volume control safety device for the purpose set forth, a structure formed with a bore having the major portion of its length constituting a valve chamber, a tubular pressure outlet element extending into one end of said bore and having its inner end constituting a valve seat, a valve operating in said chamber, a tubular pressure intake element extending into the other end of said bore and having its inner end constituting a valve seat, the inner end edge of said intake element being notched, and an adjustable keeper extending into said chamber in proximity to said intake element.

5. In a compensating volume control safety device for the purpose set forth, an element formed with a bore open at each end, a valve controlled pressure outlet means extending into and being secured to one end terminal portion of the wall of the bore, a tubular pressure intake member extending into and being secured to the other end terminal portion of the wall of the bore, said member having notches in its inner end, and the wall of said bore being formed lengthwise with a narrow groove extending inwardly from the inner end of said member.

6. In a compensating volume control safety device for the purpose set forth, an element formed lengthwise thereof with a bore open at each end, said element including a valve seat within and intermediate the ends of the bore, a tubular pressure outlet element secured within and extending from one end terminal portion of the bore, said element having its inner end spaced outwardly adjacent to said seat, a tubular pressure intake member secured within and extending from the other end terminal portion of the bore, said bore between the inner end of said member and said seat constituting a valve chamber, a valve operating in said chamber, a valve controlled by-pass opening into said chamber in proximity to the inner end of said member and into said bore outwardly adjacent said valve seat, said member having its inner end notched, and the wall of said bore being formed with a short groove extended from the inner end of said member.

ELDRED B. BRANNAN.